March 12, 1957  C. W. HANSLIP  2,784,824
FRICTION BRAKE OR CLUTCH
Filed Jan. 3, 1955  2 Sheets-Sheet 1
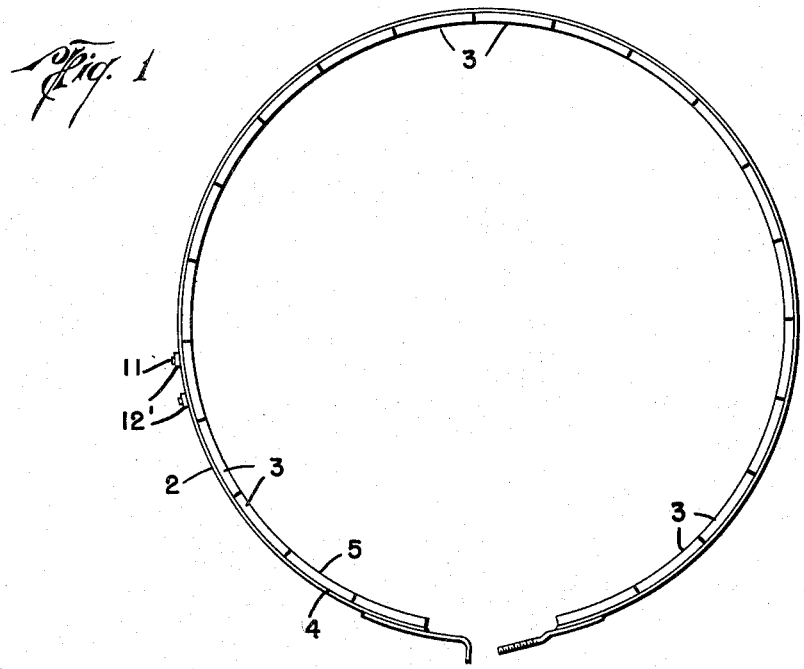
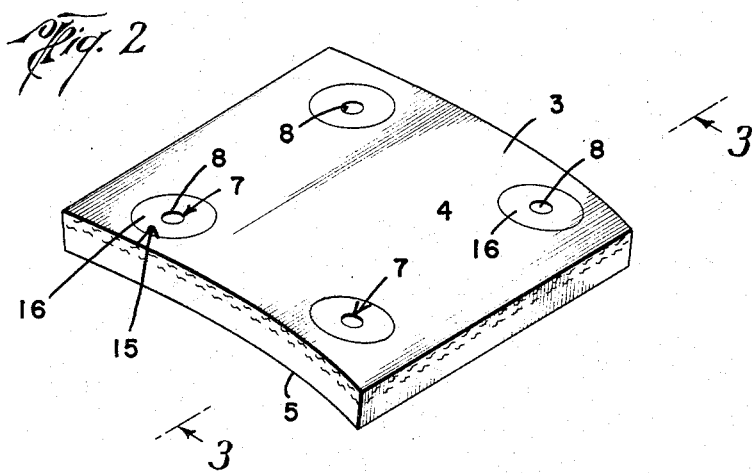
Charles W. Hanslip
INVENTOR.
BY Jack W. Hayden
ATTORNEY March 12, 1957  C. W. HANSLIP  2,784,824
FRICTION BRAKE OR CLUTCH
Filed Jan. 3, 1955  2 Sheets-Sheet 2

Charles W. Hanslip
INVENTOR.

BY *Jack W. Hayden*

ATTORNEY.

United States Patent Office 2,784,824
Patented Mar. 12, 1957

2,784,824

FRICTION BRAKE OR CLUTCH

Charles W. Hanslip, Houston, Tex.

Application January 3, 1955, Serial No. 479,467

14 Claims. (Cl. 192—107)

The present invention relates to an improvement in friction brakes and clutches formed of woven compositions.

Brake and clutch blocks or elements are generally formed of a composition including asbestos or the like which composition has a relatively low shear strength and which is not suited to resist crushing upon the application of excessive pressure thereto. Theoretically, the static or stationary friction set up between the brake block carrier and the brake or clutch block secured thereto is equal to the kinetic or moving friction between the front or friction surface of the brake or clutch block and the drum which the surface contacts. However, this is not always true in practical applications, and many times during operation a tremendous shearing action may be exerted on the brake block or element which tends to cause the brake block or element to pull loose from the carrier on which it is mounted.

Also, when the blocks are positioned on the carrier, it is not uncommon to clamp them too tightly so that the brake lining is crushed in that area between the engagement of the clamping means and the brake block carrier. This leaves the brake block or element loosely connected to the carrier which in turn lessens the shear strength of the brake.

An object of the present invention is to provide a brake construction which eliminates the foregoing problems.

Still another object of the invention is to reinforce woven brake linings so as to inhibit crushing thereof when they are secured to the lining carrier.

Still another object of the invention is to provide a brake or clutch block or element which has a portion therein of hardened synthetic resin extending from the back surface of the block to a depth less than the distance between the back and front surface of such block so as to reinforce the block whereby it may be engaged with a carrier by suitable clamping means.

Still another object of the invention is to provide an improved brake or clutch construction in which the brake or clutch block or linings may be secured to the bands or other carriers by use of bolts or rivets or any other suitable clamping means without damaging or crushing such blocks or decreasing the strength thereof.

Still another object of the invention is to provide a woven brake or clutch lining which has a hardened portion therein which is spaced from the front or friction surface of the block so as to not interfere with the normal function of the block, but reinforces the block whereby it may be secured to a band or carrier by any suitable means such as bolts, rivets or other clamping members.

Yet a further object is to harden an integral portion of a brake block whereby it may be secured to a brake block carrier without damage to the block and which hardened portion is arranged in the block so that it will not engage the drum or other friction surface against which the brake block is to operate.

Other objects and advantages of the invention will become more readily apparent from a consideration of the following description and drawings wherein:

Fig. 1 is a side view illustrating a brake or clutch band construction;

Fig. 2 is a perspective view of the friction block illustrating one form of the invention;

Figure 3:
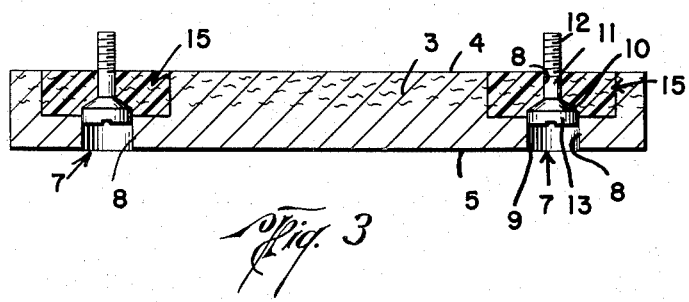
Fig. 3 is a sectional view on the line 3—3 of Fig. 2 illustrating the structural details of the friction block shown in Fig. 2.

As previously mentioned, a great deal of difficulty is encountered in attempting to position brake blocks or elements on a carrier and to maintain such elements in position over an extended period of use. All of the various means used for securing the brake block or element to its band or carrier rely upon a member which engages the block or element and the carrier therefor and clamps or wedges such block or element tightly against the carrier. All of such means, by reason of such clamping action, crush the brake lining and thereby weaken the connection between the brake block or element and carrier. This causes early failure of the brake construction.

In Fig. 1 of the drawings a circular band or carrier is illustrated at 2. Friction blocks 3 are secured on the inner surface thereof whereby they may be frictionally engaged with a drum (not shown). The blocks 3 are provided with coaxial cylindrical front and back surfaces 5 and 4 for fitting or engaging the block 3 to the carrier 2 and for providing a friction surface for frictionally engaging the complementary relatively rotatable cylindrical friction surface on the drum respectively. The blocks 3 may be circumferentially arranged on the band or carrier as illustrated in Fig. 1 of the drawings.

Such blocks or elements may be secured to the band 2 by any suitable means and to this end, passageways denoted generally by the numeral 7 are provided in the block or element 3. The form of the passageway 7 in Fig. 2 is illustrated as being a plurality of spaced openings having a portion thereof adjacent the front surface 5 of the block 3 of a larger diameter as illustrated at 9, whereby a ledge or shoulder 10 is formed in the opening between the front surface 5 and the back surface 4 of the block. A bolt 11 having a threaded portion 12 thereon is adapted to fit in the opening 8 with the head 13 resting on the ledge or shoulder 10, whereby such block may be clamped or wedged in position on the band 2 by engaging the nut 12' with the threaded portion 12 of the bolt 11 which protrudes through an opening in the band or carrier 2.

In Fig. 1 the block or element 3 is shown as positioned on the band 2 by engagement of the nut 12' with the bolt 11 or bolt 26, depending upon which type engaging or clamping means is used, and while only one of such elements 3 is illustrated as being secured on the band, it will be understood that all of the elements are secured in position circumferentially about the band in a similar manner.

To reinforce the block 3 and to inhibit crushing or damage to the block 3 by reason of the clamping action of the securing means, such block is provided with a hardened portion denoted generally by the numeral 15. As illustrated in Fig. 2 of the drawings, such hardened portion 15 surrounds the passages 7 as shown at 16, so as to reinforce the block 3 in the area where it is clamped to the band 2.

Such hardened portion 15 is an integral part of the block 3 and is formed by impregnating or saturating the block 3 with a resinous plastic material which hardens upon drying. It is to be noted that the portion 15 is between the front surface 5 and back surface 4 of the block 3 and extends toward such front surface to a depth less than the distance between the surfaces. It may extend approximately one-half the distance between the front and back surface, however, such hardened portion must extend only to a depth greater than the distance from the back surface 4 to the shoulder or ledge 10 so that the area of engagement between the clamping means, which in Fig. 3 is in the form of the bolt 11, and the block 3 is completely surrounded and reinforced by the hardened portion 15. In some forms of the invention, it may be desirable to impregnate the block 3 with a laterally extending strip of resinous material as illustrated at 17. However, such impregnation will be to a depth only sufficient to reinforce the block at the area of engagement of the clamping means therewith so as to inhibit crushing of such block by such clamping means.

Under no circumstances will the resinous material be impregnated in the block 3 so as to extend completely between the surfaces 4 and 5. The distance or depth of impregnation may vary depending upon the type of clamping or securing means to be used.

Figure 5:
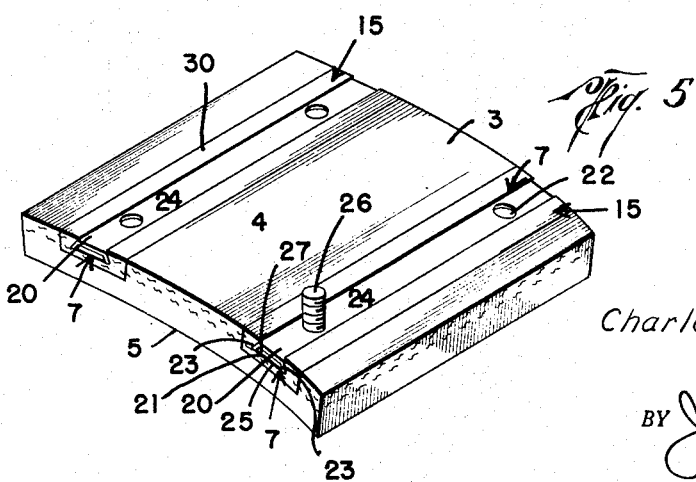
Fig. 5 is a perspective view illustrating another modification of the invention with a different type clamping means illustrated.

An illustration of an alternate type of clamping or securing means is illustrated in Fig. 5 of the drawings wherein a laterally extending metal strip 20 is adapted to slidably fit in the dovetail groove 21 formed on the back surface 4 of the block 3. The strip 20 is provided with openings 22 and side legs 23 which legs fit the inclined slopes of dovetail groove 21 and space the bottom 24 of the strip from the bottom 25 of the groove whereby a bolt 26 may be positioned in the area 27 between the strip bottom 24 and groove bottom 25 for securing the block 3 to the band. When this form of clamping means is to be used, the hardened portion, generally denoted by the numeral 15, is illustrated at 30 as extending laterally across the block and extending from the back surface 4 to a depth less than the distance between the surface 4 and 5, but greater than the distance from the surface 4 to the groove bottom 25 so that the area of engagement between the clamping means and the brake block or element is surrounded by the hardened resinous reinforced portion.

Figure 4:
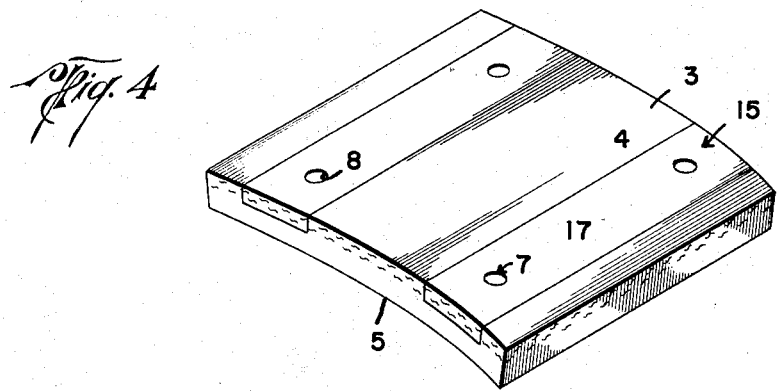
Fig. 4 is a perspective view illustrating another modification of the invention.

The resinous material may be applied to the brake block or brake lining by any suitable means and may be of any configuration such as illustrated in Figs. 2, 4 and 5, depending upon the type clamping means to be used for securing the block 3 to the band 2. However, the depth of the resinous material in the block 3 to form the hardened portion 15 is such that the area of engagement of the clamping means, regardless of which form may be used with the block 3 is completely reinforced. This prevents crushing of the block when it is secured to the band 2.

Since the hardened portion 15 is integrally formed with the block 3, the resistance to shear along the angular plane of rotation of the drum is increased and also, the block is strengthened in its area of engagement with the band. Phenolic resins have been found to be quite satisfactory for forming the hardened portion 15. Any suitable synthetic resin may be used which resin hardens upon drying.

Various modifications may be apparent to those skilled in the art and the present invention is limited only by the scope of the appended claims.

What is claimed is:

1. In a brake or clutch friction block having coaxial cylindrical front and back surfaces, said front surface being a friction surface for frictionally engaging a complementary relatively rotatable cylindrical friction surface to check relative rotation between said front surface and said complementary cylindrical friction surface, said back surface being for engagement with the cylindrical surface of a block carrier, said block having one or more openings therein for engaging and receiving a clamping element on said carrier, and said block having a relatively hardened portion of resinous plastic material to reinforce said block where it is engaged by said clamping element to hold said block against the carrier.

2. In a brake or clutch friction block having front and back surfaces, said front surface being a friction surface for frictionally engaging a complementary relatively rotatable friction surface to check relative rotation between said front surface and said complementary friction surface, said back surface being for engagement with the surface of a block carrier, said block having one or more openings therein for engaging and receiving a clamping element on said carrier, and said block having a relatively hardened portion formed by impregnating such portion with a resinous plastic material extending only from said back surface of said block toward said front surface to reinforce said block at said one or more openings.

3. In a brake or clutch friction block having front and back surfaces, said front surface being a friction surface for frictionally engaging a complementary relatively rotatable friction surface to check relative rotation between said front surface and said complementary friction surface, said back surface being for engagement with the surface of a block carrier, said block having one or more openings therein for engaging and receiving a clamping element on said carrier, and said block having a portion of hardened resinous plastic material extending from the back surface toward the front surface approximately one-half the thickness of the block to reinforce said block at the one or more openings therein.

4. In a brake or clutch friction block having front and back surfaces, said front surface being a friction surface for frictionally engaging a complementary relatively rotatable friction surface to check relative rotation between said front surface and said complementary friction surface, said back surface being for engagement with the surface of a block carrier, said block having one or more openings therein for engaging and receiving a clamping element on said carrier, and said block having a portion of hardened resinous material extending only from the back surface toward the front surface a sufficient distance to reinforce said block where it is engaged by said clamping element.

5. In a brake or clutch friction block having front and back surfaces, said front surface being a friction surface for frictionally engaging a complementary relatively rotatable friction surface to check relative rotation between said front surface and said complementary friction surface, said back surface being for engagement with the surface of a block carrier, said block having one or more openings extending therethrough for engaging and receiving a clamping element on said carrier, and said block having a portion of hardened resin extending only from the back surface toward the front surface a sufficient distance to reinforce said block adjacent said one or more openings.

6. In a brake or clutch friction block having coaxial cylindrical front and back surfaces, said front surface being a friction surface for frictionally engaging a complementary relatively rotatable cylindrical friction surface to check relative rotation between said front surface and said complementary cylindrical friction surface, said back surface being for engagement with the cylindrical surface of a block carrier, said block having one or more openings extending from the front through the back surface for engaging and receiving a clamping element on said carrier, and said block having a portion of hardened synthetic resin extending only from the back surface toward the front surface a sufficient distance to reinforce said block at said one or more openings to inhibit crushing of said block by said clamping element.

7. In a brake or clutch friction block having coaxial cylindrical front and back surfaces, said front surface being a friction surface for frictionally engaging a complementary relatively rotatable cylindrical friction surface to check relative rotation between said front surface and said complementary cylindrical friction surface, said back surface being for engagement with the cylindrical surface of a block carrier, said block having one or more dovetail grooves in its back carrier engaging surface extending completely across said back surface for engaging and receiving a guiding and clamping strip on said carrier, and said block having a portion of hardened synthetic resin extending only from the back surface to the front surface a sufficient distance to reinforce said block along said one or more grooves to inhibit crushing of said block by said clamping strip.

8. A clutch or brake construction comprising a friction element having a friction surface for frictionally engaging a cooperating relatively movable friction surface to check relative rotation between said surfaces about a common axis, an element carrier to which said friction element is secured movable to bring said friction surfaces into and out of engagement with each other, means for securing said element to said carrier, and said element having a hardened plastic resin therein for reinforcing said block where it is engaged by said securing means to aid in maintaining said element in position on said carrier by said securing means.

9. In a brake or clutch friction block having coaxial cylindrical front and back surfaces, said front surface being a friction surface for frictionally engaging a complementary relatively rotatable cylindrical friction surface to check relative rotation between said front surface and said complementary cylindrical friction surface, said back surface being for engagement with the cylindrical surface of a block carrier, said block having one or more dovetail grooves in its back carrier engaging surface extending completely across said back surface for engaging and receiving a guiding and clamping strip on said carrier, and said block having a hardened synthetic resin therein extending from said back surface toward said front surface and of a depth less than the distance between said front and back surfaces, but greater than the depth of said groove.

10. In a brake or clutch friction block having coaxial cylindrical front and back surfaces, said front surface being a friction surface for frictionally engaging a complementary relatively rotatable cylindrical friction surface to check relative rotation between said front surface and said complementary cylindrical friction surface, said back surface being for engagement with the cylindrical surface of a block carrier, said block having one or more openings extending from the front through the back surface of the block with such openings having a larger diameter toward the front surface than at the back surface of the block to form a ledge at the point of juncture of the differing diameters of the opening for supporting a clamping element to secure said block to said carrier, and said block having a hardened synthetic resin therein extending from said back surface toward said front surface and of a depth less than the distance between said front and back surfaces, but greater than the distance from said back surface to said clamp support ledge.

11. In a brake or clutch friction block having front and back surfaces, said front surface being a friction surface for frictionally engaging a complementary relatively rotatable friction surface to check relative rotation between said front surface and said complementary friction surface, said back surface being for engagement with the surface of a block carrier, means for engaging said block and detachably securing and clamping said block to the block carrier, and said block having a hardened resinous material therein extending between said back and front surfaces and of a depth less than the distance between said front and back surfaces and reinforcing the area of engagement between said block and its carrier engaging means.

12. A clutch or brake construction comprising a friction element having a friction surface for frictionally engaging a cooperating relatively movable friction surface to check relative rotation between said surfaces about a common axis, an element carrier to which said friction element is secured movable to bring said friction surfaces into and out of engagement with each other, means for engaging said element and detachably securing said element to said carrier, and said element having a hardened resinous material therein for reinforcing the area of engagement of said element and its carrier engaging means.

13. In a brake or clutch friction block having front and back surfaces, said front surface being a friction surface for frictionally engaging a complementary relatively rotatable friction surface to check relative rotation between said front surface and said complementary friction surface, said back surface being for engagement with the surface of a block carrier, said block having one or more passages therein for and receiving an element for connecting said block to said carrier, and said block having in an integral portion thereof a hardened resinous material extending between said front and back surfaces and of a depth less than the distance between said front and back surfaces and surrounding the area of engagement of said block and its carrier connecting element.

14. An external band brake or clutch construction comprising a brake or clutch band expansible and contractible to vary its radius, a plurality of circumferentially spaced friction blocks secured to the inside of the band for bearing on the brake drum, each friction block having one or more passages therein for engaging and receiving a clamping element for drawing said block toward the band to clamp the block and band together, and said block having in an integral portion thereof a hardened synthetic resinous material extending between said front and back surfaces and of a depth less than the distance between said front and back surfaces and reinforcing the area of engagement of said block and its band clamping element.

References Cited in the file of this patent
UNITED STATES PATENTS

| | | |
|---|---|---|
| 1,020,778 | Prange | Mar. 19, 1912 |
| 1,682,319 | Bluhm | Aug. 28, 1928 |